Figure 1:
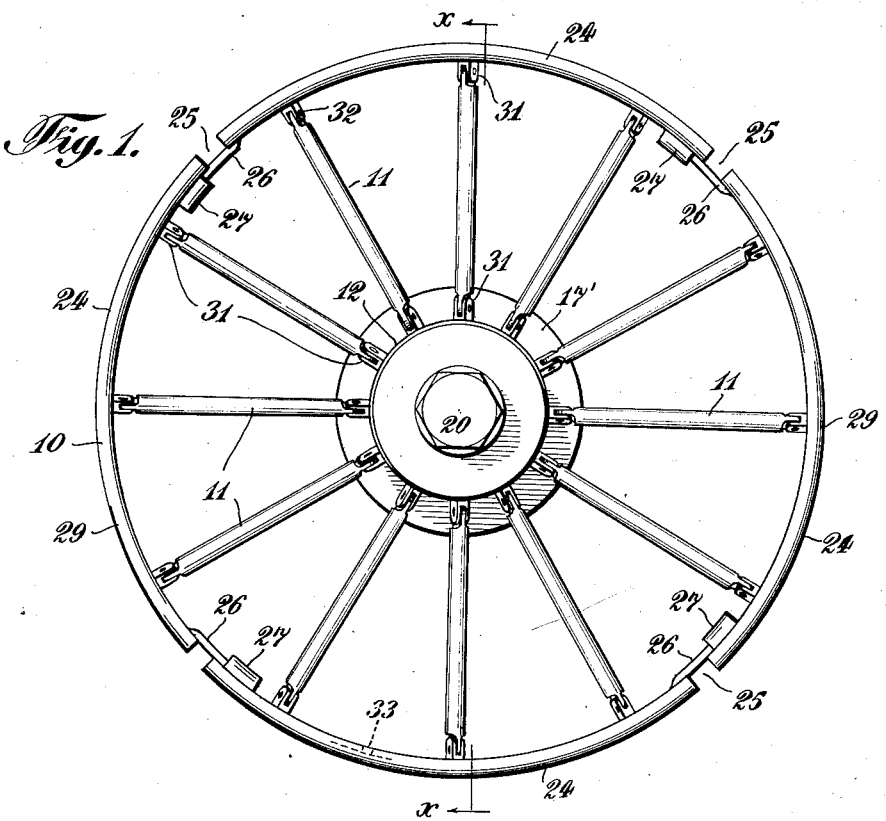

Nov. 3, 1925. 1,560,449
A. WANG
WHEEL
Filed April 23, 1925  2 Sheets-Sheet 1

INVENTOR
*Alfred Wang*
BY
*Peter M. Bousey*
ATTORNEY

Nov. 3, 1925.

A. WANG 1,560,449

WHEEL

Filed April 23, 1925  2 Sheets-Sheet 2

INVENTOR
Alfred Wang
BY
Peter M. Boesen
ATTORNEY

Patented Nov. 3, 1925.

1,560,449

UNITED STATES PATENT OFFICE.

ALFRED WANG, OF HOBOKEN, NEW JERSEY.

WHEEL.

Application filed April 23, 1925. Serial No. 25,211.

*To all whom it may concern:*

Be it known that I, ALFRED WANG, a subject of the King of Denmark, whose residence is #42—14th Street, Hoboken, county of Hudson, and State of New Jersey, have invented certain new and useful Improvements in Wheels, of which the following is a full, clear, and exact description.

This invention relates to improvements in wheels carrying rubber tires, and especially automobile wheels, and has for its object to facilitate the quick removal of the tire when repairing or a change of tires is needed.

I accomplish this object by construction of a wheel that to some extent is collapsible, while in extended position it presents a rigid structure.

While I intend to avoid the use of a separate rim for carrying the tire, it is obvious that with a slight modification in construction the felly might easily be adapted for use in connection with a rim for carrying the tire.

With the above and other objects in view, the invention consists of the novel features of construction, combination and arrangement of parts hereinafter fully described and claimed, and illustrated in the accompanying drawings, in which similar characters of reference indicate corresponding parts in all the views, and in which:—

Figure I is a front view of an embodiment of my invention;

Figure II is a vertical section on the line *x—x* of Figure I;

Figure III shows the hub illustrated in Figure II, separated by turning of the front, or outer part;

Figure IV is a detail view of the hub with the spokes removed;

Figure V is a detail sectional view of the felly;

Figure VI is a detail plan view of same;

Figure VII is a cross section on line *y—y* of Figure VI;

Figure VIII is a detail view of a spoke.

Referring in detail to the drawings, 10 designates a wheel, having spokes 11, and a hub 12, said hub being made into two jaw-clutches or sections, an outer 13 and inner 14. The hub has the usual ball bearings 15, an axle 16, and an elongated hood or bearing 17, said bearing being at its inner end provided with a loose collar 17', while at its outer end it projects outside the hub almost to a distance equal to the axle. Said collar is secured to the inner section 14 of the hub by means of screw bolts 22. The bearing 17 is on its outer end provided with a threaded portion 18 adapted to receive a regulation nut 19 which has its inner side correspondingly threaded, as shown.

A hub cap 20 provided with threaded portions on its inner surface is secured to the free end of the axle 21 and also to the nut 19, said axle and a reduced end portion of the nut 23 being provided with correspondingly threaded portions.

It is obvious that other means than a hub cap may be employed to secure the wheel to the axle as my invention does not particularly reside in this point.

The wheel consists of a felly 29, divided into four segments 24, which have between them when in extended position a cut-away portion 25. Each felly segment is at one end provided at its inner surface with a tongue 26 formed integrally therewith. Said tongue is, when the four segments are in contracted position, adapted to slide beneath the inner surface of the adjacent felly-segment, by means of guides 27. A ball bearing to facilitate such sliding movement may be provided by means of recesses at the inner surface of the felly and upon said tongue respectively as shown at 28. The spokes 11 are secured to the felly and the hub by means of brackets 31, said brackets being integral with the felly and hub respectively. Holes in the spoke adjacent each end and in each side of the bracket permit these parts to be joined by means of a pintle 32. The felly is provided with an opening 33 adapted to receive the valve stem of the tire.

Figure 8:
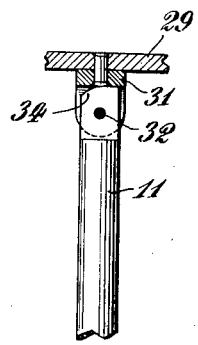
Figure 6:
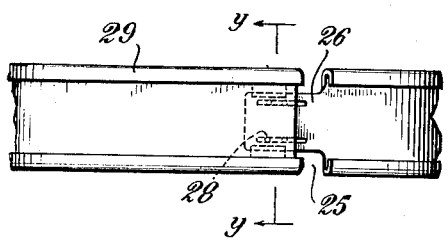
Figure 7:
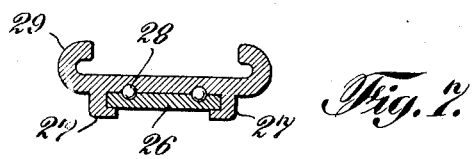

The spokes 11 have their respective end pieces shaped as shown at 34 in Figure 8, that is, the abutting end surface being formed partially flat and partially with a slight curvature in order to permit a slight contracting movement of the felly segments, when the hub parts are separated or pulled apart.

Figure 2:
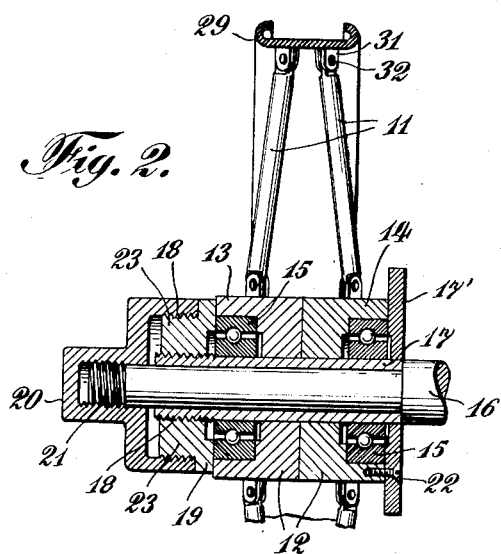
Figure 3:
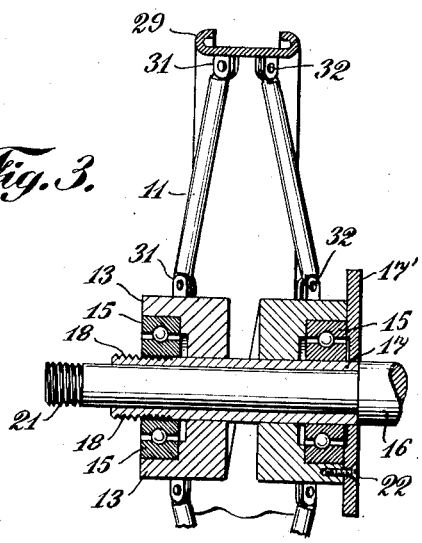
Figure 4:
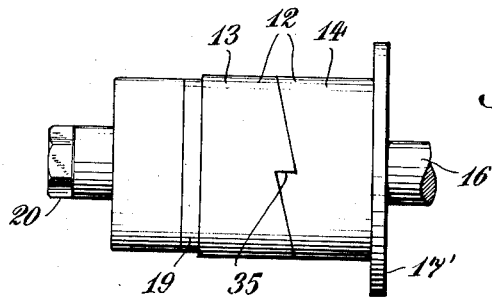
Figure 5:
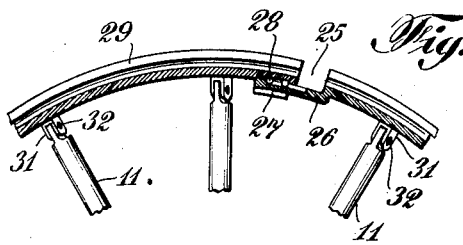

The wheel when in actual use, is in closed position as shown in Figure 2, with the hub parts, which are formed as two jaw clutches joined snugly together as shown in Figure 4.

The operation of the invention illustrated in Figures 1 to 8 is as follows: If it is desired to remove the tire from the felly, all that is necessary is to properly unscrew the regulation nut 19 with any suitable wrench.

The natural pressure of the tire conveyed by means of the spokes will then cause the hub parts to separate and such move will in turn bring about the contraction of the felly segments as the tongue on each segment will slide beneath the adjoining felly part.

While I have shown and described the preferred construction and arrangement of the various elements, it will be understood that the invention is susceptible of a great many minor modifications without departing from the essential feature or sacrificing any of the advantages thereof.

Having thus described my invention I claim as new, and desire to secure by Letters Patent:

1. A collapsible wheel comprising a plurality of felly segments, a hub composed of two sections, spokes, and means for pivotally connecting the spokes to the felly segments and to said hub sections.

2. A collapsible wheel comprising a plurality of felly segments, each segment having a tongue and guide respectively, and ball bearings provided for said tongues and adjacent felly sections, a hub consisting of two sections, brackets and bolts for pivotally connecting the spokes with the felly and the hub sections respectively.

3. A collapsible wheel having a plurality of felly segments, and a hub comprising an elongated bearing or hood, two separable jaw-clutch sections turnable on said bearing and having the usual ball bearings, a screw nut adapted to fit said bearing and regulate the movement of said jaw clutch sections with respect to one another, and a hub cap to be screwed onto the axle and the screw nut and spokes connected pivotally to the felly segments and the hub sections.

4. In a wheel for automobiles a collapsible felly, a plurality of spokes extending between the hub and felly sections, said spokes being formed with partially flat and partially curved end pieces permitting of a slight movement in contracting the felly, a hub composed of two sections turnable on an elongated bearing; said bearing having at its inner end a collar, while the other end has its outer surface threaded for the purpose of receiving a regulation nut.

5. In a wheel, the combination of a plurality of contractible felly sections with a hub composed of two sections, turnable on an elongated bearing and formed as jaw clutches, said bearing having at its inner end a loose collar, while the other end is adapted to receive a regulation nut, spokes connecting said felly parts with said hub sections and means for connecting said spokes to said hub sections and felly parts respectively, substantially a shown and decribed.

6. In an automobile wheel, a felly divided in four sections, each provided with a latent projection for connecting such sections when the wheel is in extended position; a hub comprising two sections, made to form a jaw clutch when in closed position, the outer section of said hub adapted to perform a sliding movement away from the inner section; the usual bearing elongated, as illustrated, and adapted to support the outer section of the hub in its movement thereon, and a regulation nut for controlling such movement which in its extremity causes the contraction of the felly segments, substantially as shown and described.

In testimony whereof I have hereunto set my hand.

ALFRED WANG.